US010875450B2

(12) United States Patent
Wolf et al.

(10) Patent No.: US 10,875,450 B2
(45) Date of Patent: Dec. 29, 2020

(54) ELECTRIFIED VEHICLE AND METHOD FOR PROVIDING DRIVER FEEDBACK BY PRODUCING TORQUE RIPPLE

(71) Applicant: Ford Global Technologies, LLC, Dearborn, MI (US)

(72) Inventors: Chris Wolf, Ann Arbor, MI (US); Michael Degner, Novi, MI (US); Yue Nie, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 243 days.

(21) Appl. No.: 16/122,929

(22) Filed: Sep. 6, 2018

(65) Prior Publication Data

US 2020/0079287 A1 Mar. 12, 2020

(51) Int. Cl.
*B60Q 9/00* (2006.01)
*B60L 15/20* (2006.01)

(52) U.S. Cl.
CPC ............ *B60Q 9/00* (2013.01); *B60L 15/2054* (2013.01); *B60L 2240/423* (2013.01)

(58) Field of Classification Search
CPC ....................... B60L 15/2054; B60L 2240/423
See application file for complete search history.

(56) References Cited

U.S. PATENT DOCUMENTS

| 5,765,116 A | 6/1998 | Wilson-Jones et al. |
| 6,038,496 A | 3/2000 | Dobler et al. |
| 7,102,539 B2 | 9/2006 | Kawazoe et al. |
| 7,109,850 B2 | 9/2006 | Kawazoe et al. |
| 8,786,223 B2 * | 7/2014 | Leonardi ................. B60L 50/16 318/400.02 |
| 8,841,873 B2 * | 9/2014 | Akashi .................... B60L 15/20 318/611 |
| 9,096,135 B1 | 8/2015 | Simonini |
| 9,153,108 B2 | 10/2015 | Kiefer et al. |
| 9,231,462 B2 * | 1/2016 | Hunter ...................... H02P 6/10 |
| 9,397,592 B2 * | 7/2016 | Kezobo ..................... H02P 6/10 |
| 2002/0060545 A1 * | 5/2002 | Inagaki .................. G05B 11/42 318/629 |
| 2004/0049323 A1 | 3/2004 | Tijerina et al. |
| 2008/0018291 A1 * | 1/2008 | Atarashi ................ H02K 21/16 318/730 |
| 2009/0048747 A1 * | 2/2009 | Stridsberg .............. B60W 10/11 701/55 |

(Continued)

OTHER PUBLICATIONS

"Understanding the Distinctions Among Torque Ripple, Cogging Torque, and Detent", MCMA website, all pages, posted Aug. 15, 2013, URL: https://www.motioncontrolonline.org/content-detail.cfm/Motion-Control-Tech-Papers/Understanding-the-Distinctions-Among-Torque-Ripple-Cogging-Torque-and-Detent/co (Year: 2013).*

(Continued)

*Primary Examiner* — Calvin Cheung
(74) *Attorney, Agent, or Firm* — David B. Kelley; Carlson, Gaskey & Olds, P.C.

(57) ABSTRACT

This disclosure relates to an electrified vehicle and a method for providing driver feedback by producing a torque ripple. An exemplary electrified vehicle includes, among other things, an electric machine configured to generate a torque output, and a controller configured to selectively adjust the torque output to produce a torque ripple in response to a triggering event.

20 Claims, 4 Drawing Sheets

(56) References Cited

U.S. PATENT DOCUMENTS

| | | | | |
|---|---|---|---|---|
| 2009/0108798 A1* | 4/2009 | Schulz | ............... | B60L 15/20 |
| | | | | 318/802 |
| 2010/0318249 A1* | 12/2010 | Jinno | ............... | B60L 50/16 |
| | | | | 701/22 |
| 2011/0057591 A1* | 3/2011 | Tagome | ............... | H02P 6/15 |
| | | | | 318/400.23 |
| 2012/0217908 A1* | 8/2012 | Wu | ............... | H02P 29/50 |
| | | | | 318/400.02 |
| 2014/0288758 A1* | 9/2014 | Suzuki | ............... | B60L 15/2009 |
| | | | | 701/22 |
| 2015/0025828 A1* | 1/2015 | Wang | ............... | B60L 3/0038 |
| | | | | 702/104 |
| 2016/0141984 A1* | 5/2016 | Wolf | ............... | H02P 6/16 |
| | | | | 318/400.23 |
| 2016/0315566 A1* | 10/2016 | Vuletic | ............... | B60W 10/00 |
| 2017/0229984 A1* | 8/2017 | Sato | ............... | H02P 21/06 |
| 2018/0056811 A1* | 3/2018 | Iwahana | ............... | H02P 29/00 |
| 2019/0006968 A1* | 1/2019 | Saito | ............... | H02P 6/10 |

OTHER PUBLICATIONS

Trucknews.com "Virtual Rumble Strips are Now Available in Canada," downloaded from: https://www.trucknews.com/features/virtual-rumble-strips-are-now-available-in-canada/, on Jul. 13, 2018. Louisville, KY May 1, 2003.

* cited by examiner

ELECTRIFIED VEHICLE AND METHOD FOR PROVIDING DRIVER FEEDBACK BY PRODUCING TORQUE RIPPLE

TECHNICAL FIELD

This disclosure relates to an electrified vehicle and a method for providing driver feedback by producing a torque ripple.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

Electrified and conventional motor vehicles are known to include audio, visual, and haptic feedback devices, for example, which are selectively activated to provide a driver with feedback regarding various triggering events. One such triggering event is an unintentional lane departure. Known vehicles provide driver feedback in response to a detected lane departure via audio, visual, and/or haptic feedback devices, thereby allowing the driver to assess the situation and make a corrective maneuver.

SUMMARY

An electrified vehicle according to an exemplary aspect of the present disclosure includes, among other things, an electric machine configured to generate a torque output, and a controller configured to selectively adjust the torque output to produce a torque ripple in response to a triggering event.

In a further non-limiting embodiment of the foregoing electrified vehicle, the controller is configured to adjust the torque output to produce the torque ripple for a predetermined time following initiation of the triggering event.

In a further non-limiting embodiment of any of the foregoing electrified vehicles, the controller is configured to adjust the torque output to produce the torque ripple throughout the duration of the triggering event.

In a further non-limiting embodiment of any of the foregoing electrified vehicles, the triggering event is based on one of an internal vehicle alert, an alert from a vehicle infotainment system, a sensed external condition, and a broadcast external signal.

In a further non-limiting embodiment of any of the foregoing electrified vehicles, the triggering event includes a lane departure.

In a further non-limiting embodiment of any of the foregoing electrified vehicles, the vehicle further comprises an inverter, a battery electrically coupled to the electric machine by way of the inverter, and a controller. The inverter is responsive to an instruction from the controller to adjust the torque output to produce the torque ripple.

In a further non-limiting embodiment of any of the foregoing electrified vehicles, the controller is configured to issue the instruction based on inputs of a traction torque command and a ripple command.

In a further non-limiting embodiment of any of the foregoing electrified vehicles, the controller is configured to issue the instruction to the inverter based on the sum of the traction torque command and the ripple command.

In a further non-limiting embodiment of any of the foregoing electrified vehicles, the traction torque command and the ripple command are commands of different frequencies.

In a further non-limiting embodiment of any of the foregoing electrified vehicles, the ripple command is a higher frequency than the traction torque command.

In a further non-limiting embodiment of any of the foregoing electrified vehicles, the traction torque command and the ripple command are levels of current, and the controller is configured to convert the sum of the traction torque command and the ripple command to a voltage level, and to issue the instruction to the inverter based on the converted sum.

In a further non-limiting embodiment of any of the foregoing electrified vehicles, the traction torque command is a level of current, the ripple command is a level of voltage, and the controller is configured to convert the traction torque command to a level of voltage and to issue the instruction to the inverter based on the sum of the converted traction torque command and the ripple command.

In a further non-limiting embodiment of any of the foregoing electrified vehicles, the vehicle further comprises a gearbox connected to the electric machine and configured to adjust the torque output by a predetermined gear ratio, a set of drive wheels, and an output shaft connecting the gearbox to the set of drive wheels.

A method according to an exemplary aspect of the present disclosure includes, among other things, producing a torque ripple by adjusting a torque output of a motor of an electrified vehicle in response to a triggering event.

In a further non-limiting embodiment of the foregoing method, the torque ripple is produced for a predetermined time following initiation of the triggering event.

In a further non-limiting embodiment of any of the foregoing methods, the torque ripple is produced throughout the duration of the triggering event.

In a further non-limiting embodiment of any of the foregoing methods, the torque ripple is produced by a controller which issues an instruction to an inverter to vary a voltage delivered from a battery to the motor.

In a further non-limiting embodiment of any of the foregoing methods, the controller receives inputs of a traction torque command and a ripple command, the controller bases the instruction on the traction torque command and the ripple command, and the traction torque command and the ripple command are of different frequencies.

In a further non-limiting embodiment of any of the foregoing methods, the traction torque command and the ripple command are current commands, the controller converts a sum of the traction torque command and the ripple command to a voltage level, and the controller issues the instruction to the inverter based on the converted sum of the traction torque command and the ripple command.

In a further non-limiting embodiment of any of the foregoing methods, the traction torque command is a level of current, the ripple command is a level of voltage, and the controller converts the traction torque command to a level of voltage and issues the instruction to the inverter based on the sum of the converted traction torque command and the ripple command.

DETAILED DESCRIPTION

This disclosure relates to an electrified vehicle and a method for providing driver feedback by producing a torque ripple. An exemplary electrified vehicle includes, among other things, an electric machine configured to generate a torque output, and a controller configured to selectively adjust the torque output to produce a torque ripple in response to a triggering event. While this disclosure may be used in many applications, in one particular example the triggering event is a lane departure, and the torque ripple creates feedback for the driver similar to that which would be created by a traditional rumble strip. In particular, the torque ripple may cause intermittent tactile vibration of the electrified vehicle along with audible rumbling. Accordingly, this disclosure produces a sensation similar to a rumble strip without requiring any changes to a road surface or to existing vehicle hardware. In this way, this disclosure may be said to produce a virtual rumble strip. These and other benefits will be appreciated from the below description.

Figure 1:
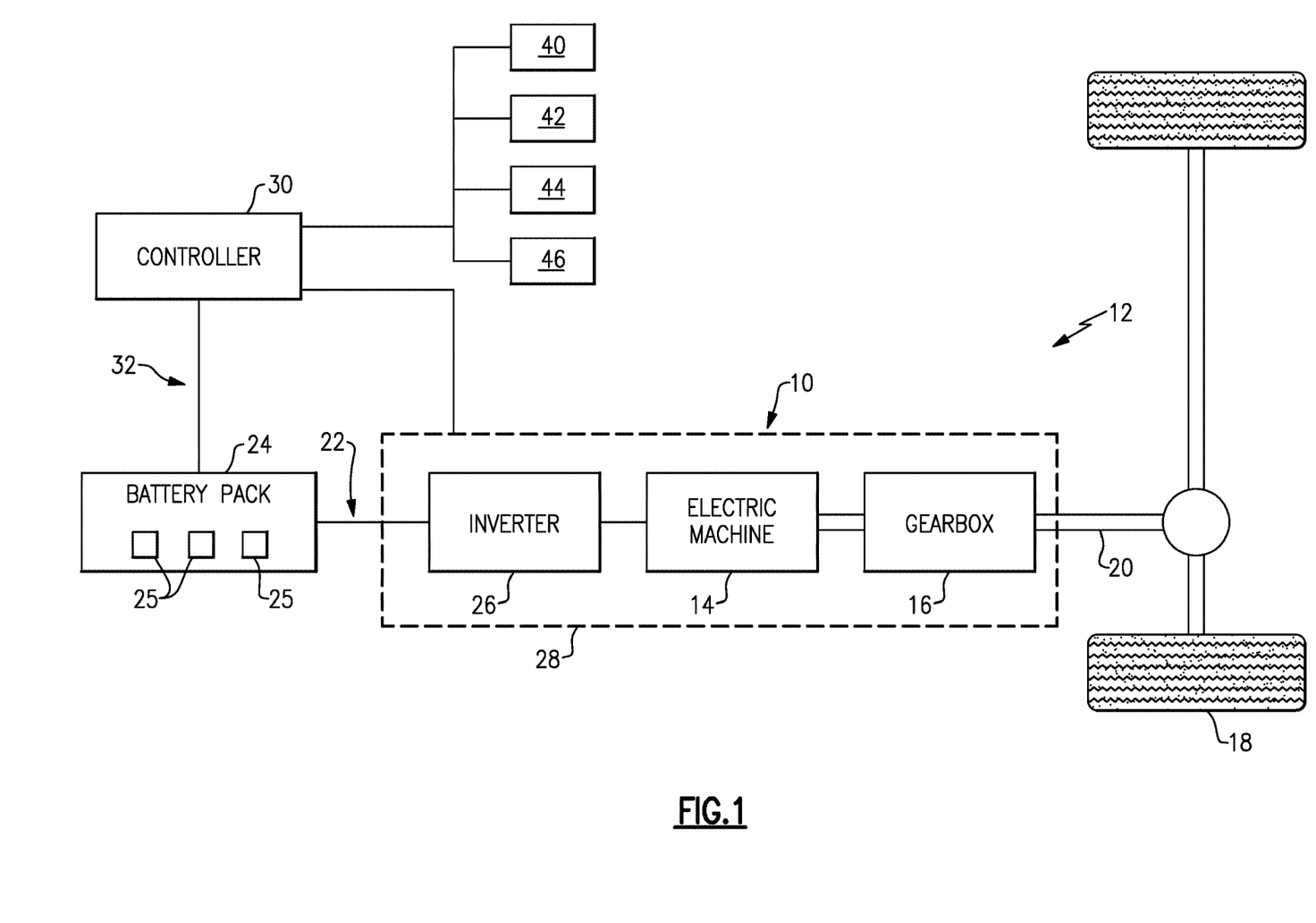
FIG. 1 schematically illustrates a powertrain of an electrified vehicle.

Referring now to the figures, FIG. 1 schematically illustrates a powertrain 10 of an electrified vehicle 12, which is shown as a battery electric vehicle (BEV). Although depicted as a BEV, it should be understood that the concepts described herein are not limited to BEVs and could extend to other electrified vehicles, including but not limited to, plug-in hybrid electric vehicles (PHEVs). Therefore, although not shown in this embodiment, the electrified vehicle 12 could be equipped with an internal combustion engine that can be employed either alone or in combination with other energy sources to propel the electrified vehicle 12. Further, this disclosure extends to any hybrid or electric vehicle including full hybrids, parallel hybrids, series hybrids, mild hybrids, and micro hybrids, among others.

In a non-limiting embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 may be provided by a permanent magnet synchronous motor, although other motors may be used. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 (i.e., a "battery") through an inverter 26. The electric machine 14, the gearbox 16, and the inverter 26 may collectively be referred to as a transmission 28.

The battery pack 24 is an exemplary electrified vehicle battery. The battery pack 24 may be a high voltage traction battery pack that includes a plurality of battery assemblies 25 (i.e., groupings of battery cells commonly known as arrays) capable of outputting electrical power to operate the electric machine 14 and/or other electrical loads of the electrified vehicle 12. Other types of energy storage devices and/or output devices can also be used to electrically power the electrified vehicle 12. The electrified vehicle 12 may also include a charging system for periodically charging energy storage devices (e.g., battery cells) of the battery pack 24. The charging system may be connected to an external power source, such as a grid power source, for receiving and distributing power to the energy storage devices.

The inverter 26 may be an electronic device including IGBTs (insulated-gate bipolar transistors) or other switches adapted to convert direct current (DC) from the battery pack 24 to alternating current (AC). In response to instructions from a controller 30, the inverter 26 may activate one or more of its switches to convert direct current from the battery pack 24 to alternating current for the electric machine 14. Based on a desired torque output, the controller 30 issues one or more instructions to the inverter 26, which in turn is operable to direct an appropriate voltage and frequency of AC current from the battery pack 24 to the electric machine 14.

In addition to communicating with the inverter 26, the controller 30 is configured to monitor and/or control various aspects of the powertrain 10 associated with the electrified vehicle 12. The controller 30, for example, may communicate with the electric machine 14, the battery pack 24, and the inverter 26. The controller 30 may also communicate with various other vehicle components and monitor other vehicle conditions. The controller 30 includes electronics, software, or both, to perform the necessary control functions for operating the electrified vehicle 12.

In one non-limiting embodiment, the controller 30 is a combination vehicle system controller and powertrain control module (VSC/PCM). Although it is shown as a single device, the controller 30 may include multiple controllers in the form of multiple hardware devices, or multiple software controllers with one or more hardware devices. A controller area network 32 (CAN) allows the controller 30 to communicate with the various components of the electrified vehicle 12.

The powertrain 10 shown in FIG. 1 is highly schematic and is not intended to limit this disclosure. Various additional components could alternatively or additionally be employed by the powertrain 10 within the scope of this disclosure.

During normal operation of the electrified vehicle 12, such as during conditions where the electrified vehicle 12 is driving in a forward direction, the electric machine 14 is operable as an electric motor, which generates a torque output that is transferred to the wheels 18 via the gearbox 16, the output shaft 20, and a differential. The torque output of the electric machine 14 is proportional to the magnitude of the current directed into the electric machine 14 from the battery pack 24 via the inverter 26. Again, the inverter 26 regulates the current directed into the electric machine 14 based on one or more instructions from the controller 30.

The controller 30, in this example, is configured to instruct the inverter 26 to regulate the current directed into the electric machine 14 based on at least two inputs. A first of the two inputs is a traction torque command. The traction torque command is based on information from vehicle controls such as the throttle (i.e., a gas pedal or accelerator pedal), the brake pedal, and/or the gear shifter. In the case of autonomous or semi-autonomous vehicles, the traction torque command may alternatively or additionally be generated based on various factors relating to control of the vehicle. The controller 30 uses the traction torque command to instruct the inverter 26 to regulate current to the electric machine 14 to accomplish a desired response of the electrified vehicle 12. For instance, if a user depresses an accelerator pedal, a corresponding traction torque command will be directed to controller 30, and the controller 30 will instruct the inverter 26 to regulate the current from the battery pack 24 to the electric machine 14 such that the electrified vehicle 12 accelerates.

A second of the two inputs is a ripple command. The ripple command, in this disclosure, is directed to the controller 30 in response to a triggering event. Example triggering events, and the manner in which these events may be detected, will be described below. When the controller 30 receives a ripple command, the controller 30 instructs the inverter 26 to regulate the current from the battery pack 24 such that the electric machine 14 produces a torque ripple. In this way, the controller 30 is configured to selectively adjust the torque output of the electric machine 14 in response to the traction torque command, and to produce a torque ripple in response to a triggering event.

Torque ripple refers to a periodic increase or decrease in output torque as an electric motor operates. Specifically, torque ripple is a periodic increase or decrease in output torque as a shaft of an electric motor rotates. Torque ripple may be measured as the difference in maximum and minimum torque over one complete revolution of the shaft of an electric motor. In one example, the minimum torque over one revolution of the shaft is the output torque of the electric machine 14 based on the traction torque command, and the maximum torque corresponds to the increases and/or decreases brought about by the ripple command.

In this disclosure, the ripple command is such that the controller 30 causes the output torque of the electric machine 14 to produce a torque ripple that causes a user to experience an intermittent tactile vibration and auditory rumble similar to that which the user would experience when driving over a traditional rumble strip. Such feedback is commonly associated with a lane departure, but this disclosure extends to other triggering events and is not limited to use in connection with lane departures. Several example triggering events, and the behavior of the electrified vehicle 12 relative to such triggering events, will now be described.

With continued reference to FIG. 1, the electrified vehicle 12 may be capable of detecting the onset of a triggering event, and detecting the continued presence of the triggering event, in a number of ways. As examples, the electrified vehicle 12 may include one or more vehicle diagnostic sensors 40, external condition sensors 42, a vehicle infotainment system 44, and/or transceivers 46 configured to receive signals broadcast to the electrified vehicle 12. The controller 30 is in communication with, and configured to interpret signals from, each of the vehicle diagnostic sensors 40, external condition sensors 42, the vehicle infotainment system 44, and/or the transceivers 46.

As examples, the vehicle diagnostic sensors 40 may be configured to generate signals indicative of internal vehicle alerts, such as fuel level or battery state-of-charge, detected vehicle faults, and driver safety alerts, including a seat belt warning, a detected decrease in driver alertness, or an alert regarding autonomous operation (e.g., driver action or driver takeover required). The external condition sensors 42 may be configured to generate signals indicative of external conditions relative to the vehicle. The external condition sensors 42 may be provided by cameras, light detection and ranging (LIDAR) sensors, or the like. The external condition sensors 42 may be configured to detect an unintended lane departure (i.e., a lane departure without a corresponding turn signal), an upcoming intersection, changes to a speed limit, and/or poor driving conditions, to name a few examples. The vehicle infotainment system 44 may be configured to generate signals indicative of navigation alerts or connected smart device alerts, as examples. Finally, the transceivers 46 may be configured to receive signals being broadcast to the electrified vehicle 12, and may be configured to relay those signals to the controller 30. The transceivers 46 may receive signals indicative of an upcoming toll station, the presence of an emergency vehicle, etc.

The controller 30 is configured to interpret information from the vehicle diagnostic sensors 40, external condition sensors 42, the vehicle infotainment system 44, and/or the transceivers 46 to identify a triggering event that justifies providing feedback to the driver. Any of the above-listed conditions (e.g., low battery state of charge, an unintended lane departure, a navigation alert, or an upcoming toll station) may be triggering events for purposes of this disclosure. These triggering events are exemplary only, and this disclosure extends to other triggering events. The controller 30 can be programmed to identify one or more triggering events.

Figure 2:
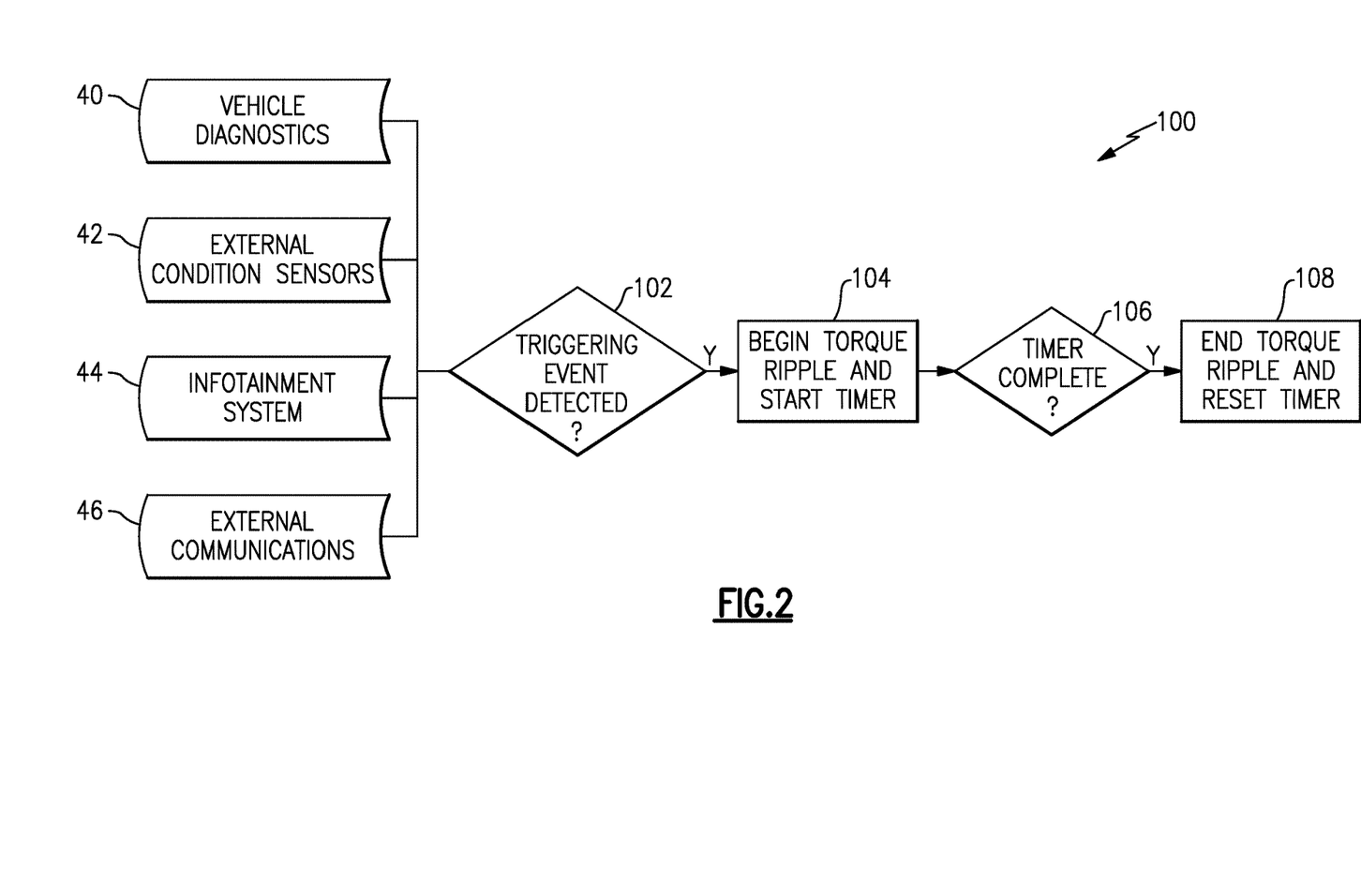
FIG. 2 illustrates a first example method which may be an aspect of an overall control scheme of the electrified vehicle.
Figure 3:
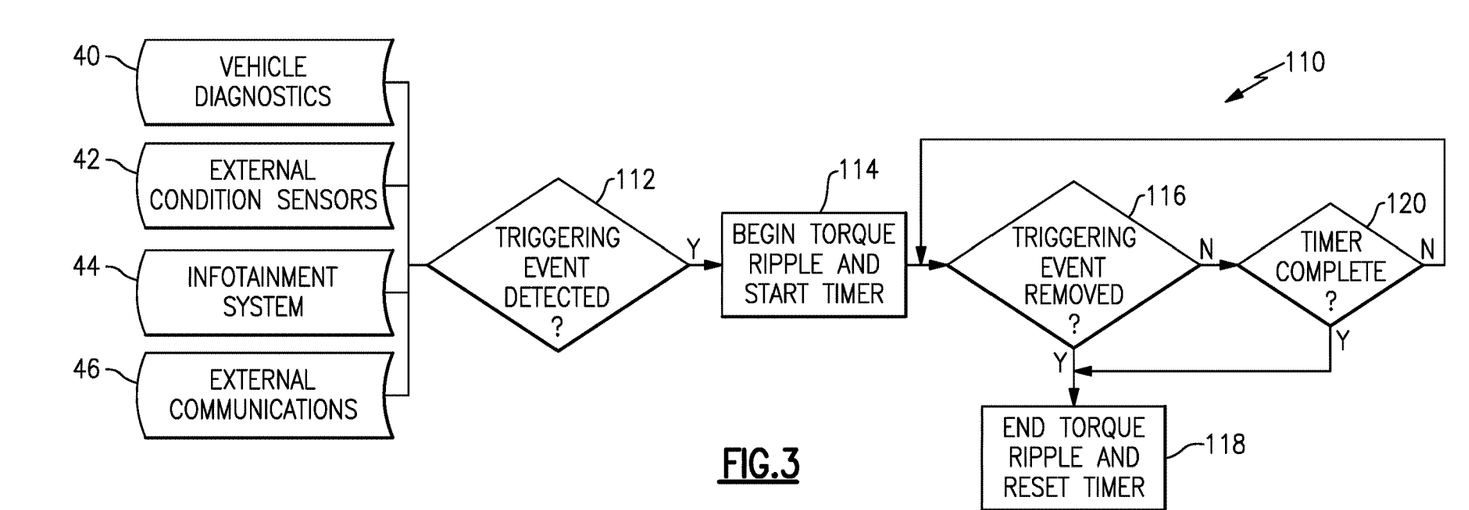
FIG. 3 illustrates a second example method which may be an aspect of an overall control scheme of the electrified vehicle.
Figure 4:
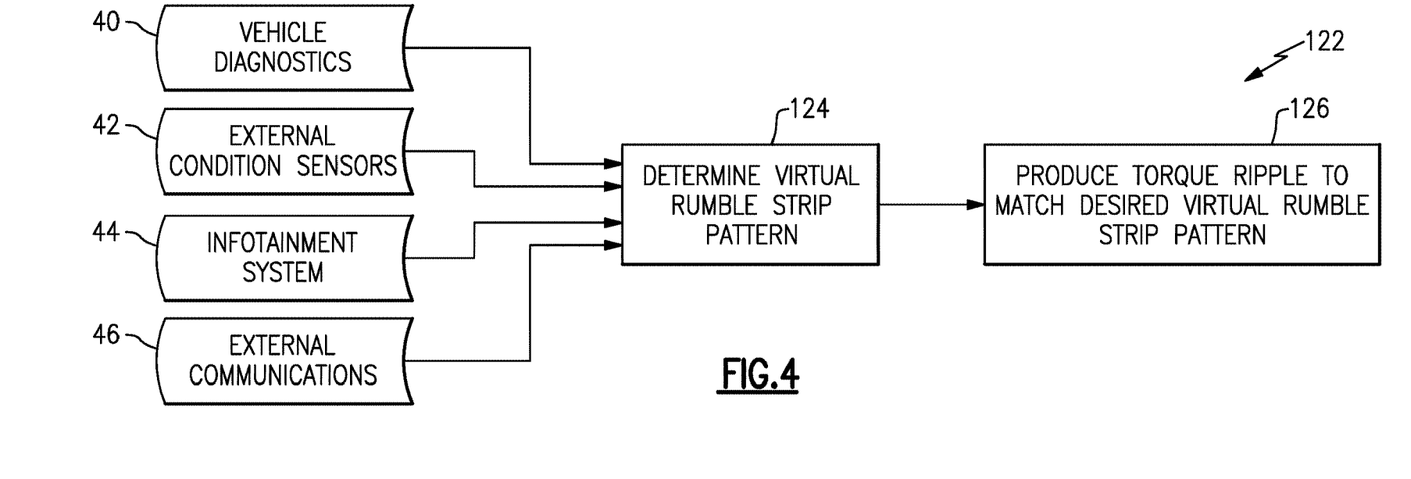
FIG. 4 illustrates a third example method which may be an aspect of an overall control scheme of the electrified vehicle.

FIGS. 2-4 are flow charts representative of the manner in which the electrified vehicle 12 may respond to various triggering events. With reference to FIG. 2, an example method 100 is illustrated. The method 100 may be an aspect of an overall control scheme associated with the electrified vehicle 12.

In the method 100, the controller 30 monitors information from the vehicle diagnostic sensors 40 (labeled "vehicle diagnostics"), external condition sensors 42, the vehicle infotainment system 44 (labeled "infotainment system"), and the transceivers 46 (labeled "external communications") to identify whether a triggering event has occurred, at 102. If so, the controller 30 will receive or generate a ripple command corresponding to the type of triggering event that occurred, as will be discussed in FIG. 4. Based on the ripple command, the controller 30 will then initiate a torque ripple and start a timer, at 104. As generally mentioned above, the controller 30 initiates the torque ripple by issuing one or more instructions to the inverter 26, which in turn adjusts the current flow from the battery pack 24 to the electric machine 14 to adjust the torque output to produce a torque ripple.

In the example of FIG. 2, the controller 30 maintains the torque ripple for a predetermined time. At 106, the controller 30 determines whether the predetermined time from the initial onset of the triggering event has lapsed, and, if it has, the torque ripple is stopped at 108. As one may appreciate, different triggering events may correspond to different predetermined times. For example, the torque ripple corresponding to a lane departure warning may be sustained for a longer predetermined time than the torque ripple corresponding to an approaching toll booth. Further, it may be desirable to have certain other triggering events be adaptive and not limited to only to a predetermined time, as will now be described relative to FIG. 3.

FIG. 3 illustrates a method 110, which, like the method 100, may be an aspect of a larger control scheme of the electrified vehicle 12. As in the method 100, the controller 30 monitors information from the vehicle diagnostic sensors 40, external condition sensors 42, the vehicle infotainment system 44, and the transceivers 46 to identify whether a triggering event has occurred, at 112. If so, then the controller 30 will either generate or receive a ripple command and initiate a torque ripple and start a timer, at 114. The timer may run for a predetermined time, as in FIG. 2, but in the method 110, the controller 30 continues to monitor the information from the vehicle diagnostic sensors 40, external condition sensors 42, the vehicle infotainment system 44, and the transceivers 46 to determine whether the triggering event has been removed prior to expiry of the timer, at 116. If the triggering event is removed, then, at 118, the controller 30 ceases the torque ripple and resets the timer. If not, the controller 30 continues the torque ripple until the timer expires, at 120. In this way, the torque ripple is not sustained for a prolonged period, which may be a nuisance to a driver. For instance, if a driver unintentionally departs a lane but then promptly corrects the lane departure, the driver would expect the torque ripple to cease.

The electrified vehicle 12 may employ either or both of the methods 100, 110. For certain triggering events, the controller 30 may employ the method 100, while for certain others the controller 30 may employ the method 110. Further, it should be understood that this disclosure is not limited to the details of the methods 100, 110. Modifications of the method 100, 110 come within the scope of this disclosure.

FIG. 4 illustrates a method 122, which is also an aspect of a larger control scheme of the electrified vehicle 12. In the method 122, the controller 30 is configured to determine a desired torque ripple based on the type of triggering event that occurs. For instance, it may be desirable to have the driver experience a lane departure warning differently than a navigation alert. FIG. 4 may be used together with the methods 100, 110 of FIGS. 2 and 3. In this sense, FIG. 4 is representative of the way in which the controller 30 may use a look-up table or the like. For instance, in FIG. 4, the controller 30 monitors information from the vehicle diagnostic sensors 40, external condition sensors 42, the vehicle infotainment system 44, and the transceivers 46. Depending on these signals, one or more triggering events may be detected. At 124, the controller 30 may use a look-up table, or the like, to determine a virtual rumble strip pattern to provide as feedback to the driver based on type of triggering event that is detected. The various rumble strip patterns may have varying intensity and frequency, as examples. If multiple triggering events occur at the same time, the controller 30 may be capable of prioritizing one over the other. For instance, if a driver unintentionally departs a lane while also receiving a navigation alert, the controller 30 may determine that the lane departure is more important to communicate to the driver and thus may select a rumble strip pattern corresponding to a lane departure warning. At 126, the rumble strip pattern is relayed to the driver as feedback via a torque ripple, as generally discussed above. Additional detail of the way in which the controller 30 instructs the inverter 26 to create the torque ripple will now be described relative to FIGS. 5 and 6.

Figure 5:
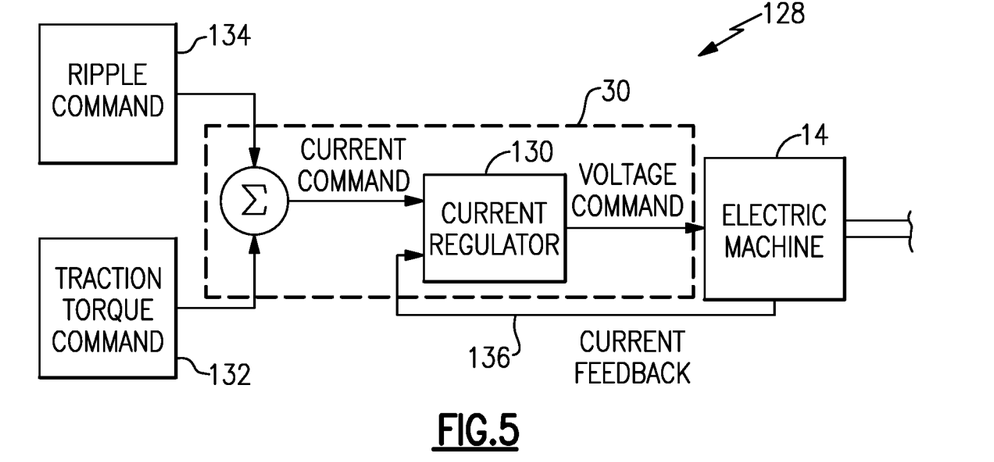
FIG. 5 is a schematic representation of an example logic of a controller relative to the inputs of a traction torque command and a ripple command.
Figure 6:
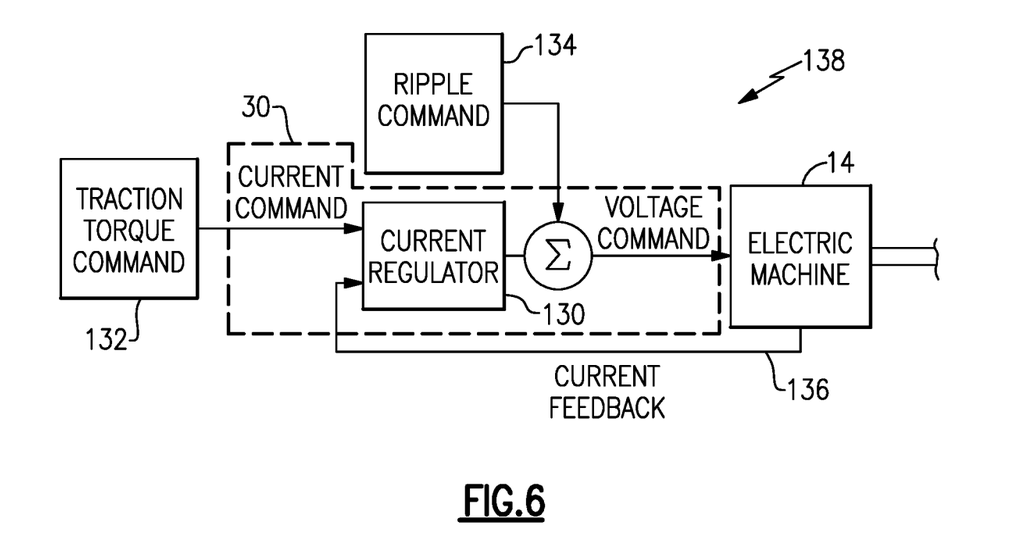
FIG. 6 is a schematic representation of another example logic of a controller relative to the inputs of a traction torque command and a ripple command.

FIGS. 5 and 6 are schematic representations of the logic of the controller 30 relative to the inputs of a traction torque command and a ripple command. The ripple command is only present, in this disclosure, when a triggering event has occurred. In particular, the ripple command would be initiated at method steps 104 and/or 114, and ended at method steps 108 and/or 118. While two commands are discussed herein, the controller 30 may receive additional inputs that are relevant to the torque output of the electric machine 14.

In FIG. 5, the schematic 128 illustrates the controller 30, which includes a current regulator 130 in this example. The current regulator 130 may be a software program or an aspect of a software program embodied on the controller 30.

In this example, the controller 30 receives two inputs, the first of which is a traction torque command 132 and the second of which is a ripple command 134. In FIG. 5, the controller 30 receives the traction torque command 132 as a commanded level of current corresponding to the various vehicle controls, such as accelerator position. The controller 30, in one example, receives the traction torque command 132 from another vehicle module. In another example, the controller 30 is configured to receive signals from various vehicle controls (e.g., accelerator pedal, brake pedal) and derive the traction torque command 132 itself. Likewise, the controller 30 may receive the ripple command 134 as a commanded level of current corresponding to a desired torque ripple. The ripple command 134 may be provided to the controller 30 from another module or the controller may derive the ripple command 134 itself. The ripple command 134 may be derived as part of the method 122 of FIG. 4, in one example.

The controller 30, in this example, is configured to issue one or more instructions to the inverter 26 based on the sum of the traction torque command and the ripple command. In particular, in this example, the controller 30 is configured to convert the sum of the traction torque command and the ripple command to a voltage level, and to issue one or more instructions to the inverter 26 based on the converted sum (which is now a voltage level). The controller 30 converts the command from one based on a current level to one based on a voltage level using the current regulator 130. The controller 30 issues instructions to the inverter 26 to supply the commanded voltage from the battery pack 24 to the electric machine 14. The controller 30 may receive feedback from the electric machine 14 via a feedback loop 136, and adjust the voltage command in real time, if needed, to achieve the voltage command and desired vehicle behavior. To this end, the controller 30 may be in communication with one or more sensors of the electric machine 14.

While in FIG. 5 the ripple command 134 was a level of current, the ripple command 134 may be level of voltage. FIG. 6 is a schematic 138 similar to that of FIG. 5, but illustrating an example way in which the controller 30 may add a voltage ripple command 134 to a current traction torque command 132. In FIG. 6, the current regulator 130 converts the traction torque command 132 to a voltage, and the controller 30 adds the ripple command 134 to the converted traction torque command 132. In the FIG. 6 example, the controller 30 may receive the ripple command 134 as a level of voltage or may derive the ripple command 134 as a voltage level. As in FIG. 5, the controller 30 issues one or more instructions to the inverter 26 to supply the commanded voltage level from the battery pack 24 to the electric machine 14. While both FIGS. 5 and 6 are effective, FIG. 6 may be more sensitive to rapid changes in torque ripple, and thus may provide a more precise torque ripple in certain situations.

As one would appreciate, the traction torque command 132 and the ripple command 134 may be sinusoids. Thus, reference to adding (or the "sum") of the traction torque command 132 and the ripple command 134 is a reference to adding two waveforms together. The two commands may resemble waveforms of different frequencies and/or magnitudes. In one particular example, traction torque command 132 is of a magnitude and frequency that corresponds to a relatively smooth driving operation. On the other hand, the ripple command 134 is of a higher frequency than the traction torque command 132, so that the torque output of the electric machine 14 oscillates relative to average and produces the desired torque ripple. In other words, the ripple command 134 causes minor disturbances to the otherwise relatively smooth traction torque command 132, which causes the electric machine 14 to produce a torque ripple, and which is experienced by the driver as feedback similar to that which would have been provided by a traditional rumble strips. While the ripple command 134 may cause minor disturbances to the electric machine 14, and in turn the electrified vehicle 12, the ripple command 134 may be of a magnitude such that vehicle operation will not be significantly disrupted. For example, using this disclosure, a driver of a vehicle traveling down a highway while unintentionally departing a lane will experience simulated rumble strips via the torque ripple but vehicle will maintain a substantially constant speed and direction of travel.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
   an electric machine configured to generate a torque output; and
   a controller configured to selectively adjust the torque output to produce a torque ripple in response to a triggering event, wherein the controller is configured to adjust the torque output to produce the torque ripple for a predetermined time following initiation of the triggering event.

2. The electrified vehicle as recited in claim 1, wherein the controller is configured to adjust the torque output to produce the torque ripple throughout the duration of the triggering event.

3. The electrified vehicle as recited in claim 1, wherein the triggering event is based on one of an internal vehicle alert, an alert from a vehicle infotainment system, a sensed external condition, and a broadcast external signal.

4. The electrified vehicle as recited in claim 3, wherein the triggering event includes a lane departure.

5. The electrified vehicle as recited in claim 1, further comprising:
   a gearbox connected to the electric machine and configured to adjust the torque output by a predetermined gear ratio;
   a set of drive wheels; and
   an output shaft connecting the gearbox to the set of drive wheels.

6. The electrified vehicle as recited in claim 1, wherein the controller is configured to intentionally cause the electric machine to produce the torque ripple in response to the triggering event.

7. An electrified vehicle, comprising:
   an electric machine configured to generate a torque output;
   a controller configured to selectively adjust the torque output to produce a torque ripple in response to a triggering event;
   an inverter;
   a battery electrically coupled to the electric machine by way of the inverter; and
   wherein the inverter is responsive to an instruction from the controller to adjust the torque output to produce the torque ripple.

8. The electrified vehicle as recited in claim 7, wherein the controller is configured to issue the instruction based on inputs of a traction torque command and a ripple command.

9. The electrified vehicle as recited in claim 8, wherein the controller is configured to issue the instruction to the inverter based on the sum of the traction torque command and the ripple command.

10. The electrified vehicle as recited in claim 9, wherein the traction torque command and the ripple command are commands of different frequencies.

11. The electrified vehicle as recited in claim 10, wherein the ripple command is a higher frequency than the traction torque command.

12. The electrified vehicle as recited in claim 9, wherein:
    the traction torque command and the ripple command are levels of current; and
    the controller is configured to convert the sum of the traction torque command and the ripple command to a voltage level, and to issue the instruction to the inverter based on the converted sum.

13. The electrified vehicle as recited in claim 9, wherein:
    the traction torque command is a level of current,
    the ripple command is a level of voltage, and
    the controller is configured to convert the traction torque command to a level of voltage and to issue the instruction to the inverter based on the sum of the converted traction torque command and the ripple command.

14. A method, comprising:
    producing a torque ripple by adjusting a torque output of a motor of an electrified vehicle in response to a triggering event, wherein the torque ripple is produced by a controller which issues an instruction to an inverter to vary a voltage delivered from a battery to the motor.

15. The method as recited in claim 14, wherein the torque ripple is produced for a predetermined time following initiation of the triggering event.

16. The method as recited in claim 14, wherein the torque ripple is produced throughout the duration of the triggering event.

17. The method as recited in claim 14, wherein:
    the controller receives inputs of a traction torque command and a ripple command,
    the controller bases the instruction on the traction torque command and the ripple command, and
    the traction torque command and the ripple command are of different frequencies.

18. The method as recited in claim 17, wherein:
the traction torque command and the ripple command are current commands,
the controller converts a sum of the traction torque command and the ripple command to a voltage level, and
the controller issues the instruction to the inverter based on the converted sum of the traction torque command and the ripple command.

19. The method as recited in claim 17, wherein:
the traction torque command is a level of current,
the ripple command is a level of voltage, and
the controller converts the traction torque command to a level of voltage and issues the instruction to the inverter based on the sum of the converted traction torque command and the ripple command.

20. The method as recited in claim 14, wherein the step of producing the torque ripple includes intentionally causing the motor to produce the torque ripple in response to the triggering event.

* * * * *